United States Patent [19]

Roulin et al.

[11] Patent Number: 5,508,075
[45] Date of Patent: Apr. 16, 1996

[54] PACKAGING LAMINATE WITH GAS AND AROMA BARRIER PROPERTIES

[75] Inventors: Anne Roulin, Molondin; M. Bertrand Jaccoud, Siviriez, both of Switzerland

[73] Assignee: Tetra Pak (Suisse) SA, Romont, Switzerland

[21] Appl. No.: 253,986

[22] Filed: Jun. 3, 1994

[30] Foreign Application Priority Data

Jun. 3, 1993 [CH] Switzerland .................................. 1666

[51] Int. Cl.⁶ ............................. B32G 1/08; B65D 65/40
[52] U.S. Cl. ........................ 428/35.7; 428/216; 428/451; 428/461; 428/480; 428/498; 428/702
[58] Field of Search ..................................... 428/35.7, 216, 428/451, 461, 498, 702, 480

[56] References Cited

U.S. PATENT DOCUMENTS

| | | |
|---|---|---|
| 3,442,686 | 5/1969 | Jones . |
| 3,808,027 | 4/1974 | Anderson et al. . |
| 4,552,791 | 11/1985 | Hahn . |
| 4,801,078 | 1/1989 | Carlsson . |
| 4,888,199 | 12/1989 | Felts et al. . |
| 5,084,352 | 1/1992 | Percec et al. . |
| 5,085,894 | 2/1992 | Pascucci et al. . |
| 5,096,738 | 3/1992 | Wyman . |
| 5,100,720 | 3/1992 | Sawada et al. . |
| 5,122,410 | 6/1992 | Lofgren et al. . |
| 5,224,441 | 7/1993 | Felts et al. . |
| 5,340,621 | 8/1994 | Matsumoto et al. . |

FOREIGN PATENT DOCUMENTS

| | | |
|---|---|---|
| 286842 | 11/1989 | Japan . |
| 3-289263 | 10/1991 | Japan . |

*Primary Examiner*—P. C. Sluby
*Attorney, Agent, or Firm*—Burns, Doane, Swecker & Mathis

[57] ABSTRACT

A layered material such as a packaging laminate for a packaging container possessing superior oxygen gas and aroma barrier properties. The packaging laminate comprises a first laminate unit and a second laminate unit which are bonded together by the intermediary of an interjacent layer of an adhesive. The first laminate unit has a rigid, but foldable core layer and outer, surrounding layers of thermoplastic, and the second laminate unit has a flexible substrate or carrier layer of thermoplastic which, on its surface, carries a layer acting as an oxygen gas and aroma barrier and consisting of a silicon oxide deposited by chemical plasma deposition and having the general chemical formula $SiO_x$, in which x may vary within the range of between 1.5 and 2.2. A flexible laminate having a $SiO_x$ barrier layer is also disclosed.

29 Claims, 6 Drawing Sheets

PACKAGING LAMINATE WITH GAS AND AROMA BARRIER PROPERTIES

TECHNICAL FIELD

The present invention relates to packaging laminates, and more specifically to laminates for packaging food products that have improved barrier properties.

BACKGROUND OF THE INVENTION

Flexible packaging laminates have been used for many years for packaging food products. For example, milk has been packaged in cartons made from a laminate of paperboard with a coating of polyethylene on both sides so that the surfaces of the carton can be heat-sealed together to form a carton of the desired shape. Some food products, such as orange juice, lose their nutritional value due to the penetration of oxygen through the wall of the carton. To reduce the penetration of oxygen into the carton and to minimize the degradation of nutrients such as vitamin C and to minimize the absorption of the flavor oils into the packaging laminate, it has been common to add a layer of aluminum foil to the laminate. Although aluminum foil is effective as a barrier material, its use raises environmental concerns. Various attempts have been made to develop practical alternatives to aluminum foil that have superior oxygen, gas and aroma barrier properties, and yet are readily disposable after use.

In the process of packaging food products, a carton blank may be folded along one or more crease lines to allow the carton to be properly shaped and to form overlapping portions of the packaging material to form a seal either by the application of a suitable adhesive, or by heat-sealing thermoplastic layers together. Creasing of the laminate imposes stresses on the laminate which may be sufficiently great to cause leakage, or may at least weaken the laminate sufficiently so that subsequent handling of the carton may lead to leakage.

OBJECTS AND SUMMARY OF THE INVENTION

In view of the deficiencies of prior barrier laminates, it is an object of this invention to provide a packaging laminate that has superior barrier properties.

It is a further object of this invention to provide a packaging laminate that is flexible and readily capable of being formed into packages using conventional packaging machines.

A further object is to provide a packaging laminate that may be readily disposed of without harm to the environment.

These objects are accomplished by a laminate having a substrate on which a layer of silicon oxide is applied by chemical plasma deposition. The silicon oxide that is deposited has the general formula $SiO_x$, in which x is within the range of between 1.5 and 2.2.

Plasma enhanced chemical vapor deposition (PECVD) is a known technique which, when applied in accordance with the present invention, is based on the concept that a mixture of a vaporized, organic silicon compound, e.g., tetramethyl disiloxane (TMDSO) or hexamethyldisiloxane (HMDSO), an inert gas (e.g., helium) and oxygen gas is fed into a vacuum chamber where a plasma is ignited and the vaporized silicon compound reacts with oxygen to form the pertinent silicon oxide compound which is deposited on and chemically bonded to a cooled substrate or core layer in the vacuum chamber.

By regulating the quantity of oxygen in the gas mixture which is fed into the vacuum chamber, it is possible to control the chemical reaction within the vacuum chamber in such a manner that the thus-formed silicon oxide assumes the chemical formula $SiO_x$ in which x may vary from a value of less than 1.5 to values far in excess of 2.5. According to the present invention, the chemical reaction is controlled such that x is in the range of between 1.5 and 2.2, which has proved to be that range within which the formed silicon oxide compound displays optimum properties as regards oxygen gas and aroma barrier and other properties valuable for the packaging laminate.

The chemical plasma deposition process is controlled in such a manner that the silicon oxide compound is formed directly on the surface of the substrate, whereby the yield of the chemical reaction involved will be high, e.g., 45%, while the compactness of the thus-formed silicon oxide layer on a substrate or core layer will, from the barrier viewpoint, be high such that the silicon oxide layer can be made very thin without any loss of the desired barrier properties. The preferred substrates are flexible thermoplastic materials, such as polyethylene, polypropylene or polyethylene terephthalate (PET).

It has been found that the silicon oxide layer formed by PECVD is able to withstand substantial elongation without rupture. This is a particularly important characteristic when the silicon oxide layer is incorporated in a laminate that is to be used for packaging food products. Typically, the packaging laminate has crease lines formed in the surface of the laminate to facilitate bending and folding to form a package. The ability of the silicon oxide layer to be deformed without rupture assures that leakage will not occur along the crease lines. The thin silicon oxide layer formed by plasma enhanced chemical vapor is especially useful in packaging liquid food products.

BRIEF DESCRIPTION OF THE DRAWINGS

Preferred embodiments of the present invention are illustrated in the accompanying drawings, in which.

DESCRIPTION OF PREFERRED EMBODIMENTS

Various processes are known for utilizing PECVD to produce thin films on substrates. U.S. Pat. No. 4,888,199 describes a process of depositing a thin film onto the surface of a substrate with the use of a plasma under controlled conditions. The plasma is formed in an enclosed reaction chamber in which a substrate is positioned to receive a thin film deposited on its surface. The substrate can be formed of metal, glass, or certain plastics. The air is pumped out of the chamber until a high vacuum is achieved. For example, an organosilicon compound, such as hexamethyldisiloxane, is introduced into the chamber with oxygen and helium, so that silicon molecules and oxygen molecules are deposited on the surface of the substrate. The resulting film is described in U.S. Pat. No. 4,888,199 as being a thin film that is very hard, scratch-resistant, optically clear and adheres well to flexible substrates. The disclosure of this patent is incorporated herein as if fully set forth. An improved PECVD process is described in U.S. Pat. No. 5,224,441, which is also incorporated herein as if fully set forth. In the process described in this patent, the substrate on which the silicon oxide is applied is maintained at a temperature of about 20° C., and the substrate may be formed of polyethylene terephthalate (PET). The patent describes the silicon oxide film as having a thickness of 100 Å to about 400 Å (0.0004 mils to about 0.0016 mils) and the thickness of the substrate to be about 0.5 to 1 mil for food packaging applications.

Liquid food products such as milk and juices are currently being packaged in cartons formed from laminated packaging material. The packages may be in the form of gable top cartons or rectangular packages, such as TETRA BRIK packages. Gable top cartons are formed from precut rectangular blanks that are folded transversely to form a tube and overlapping opposite edges that are heat-sealed together and the pre-formed blanks are supplied to a filling machine as a flattened tube. The filling machine opens the tube and heat seals the base to form a carton, fills the carton with a liquid food product, and closes and seals the top of the carton. Rectangular packages, such as TETRA BRIK packages, may be formed from a large roll of packaging material that is progressively formed into a tube, filled with the liquid food product, and closed by heat sealing. In both cases, the packaging material is provided with crease lines to facilitate folding of the material along prescribed lines.

Figure 3:
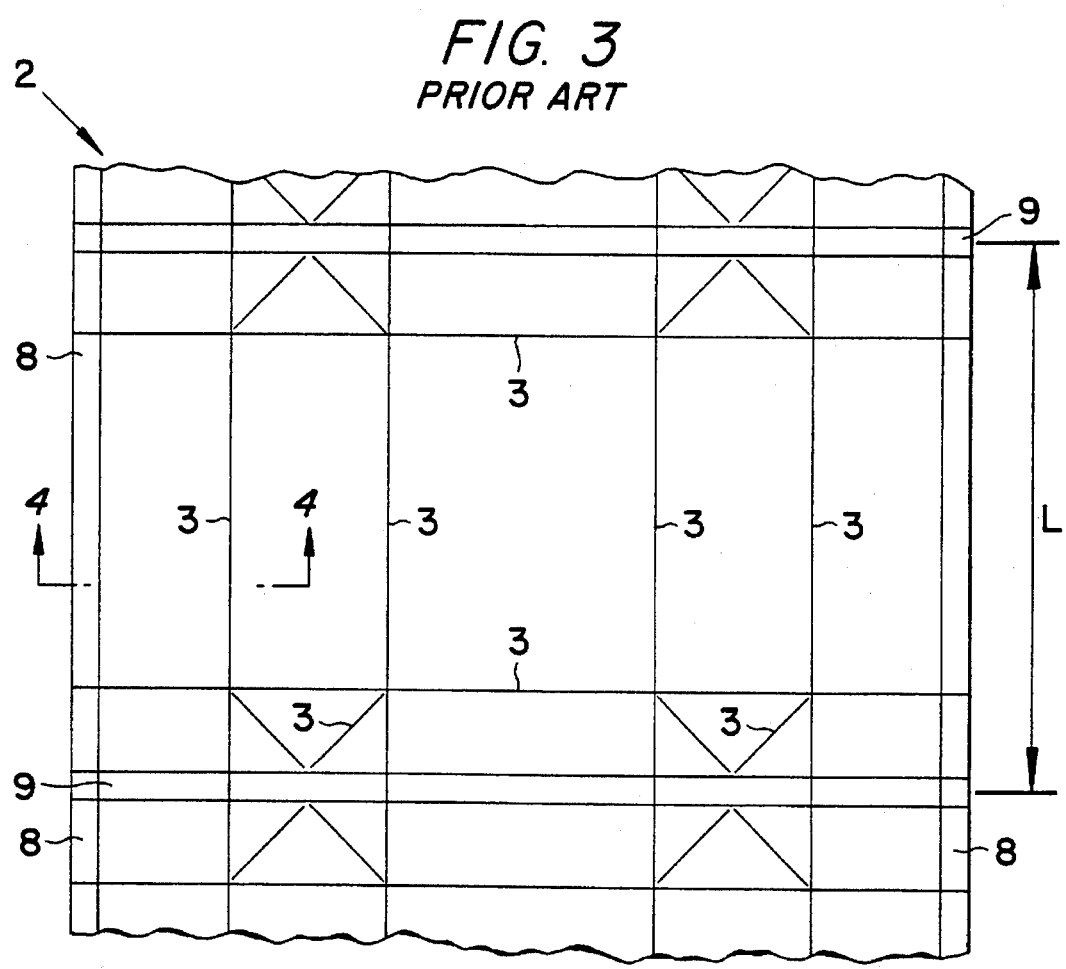
FIG. 3 is a top plan view of a packaging laminate with crease lines in accordance with this invention.
Figure 4:
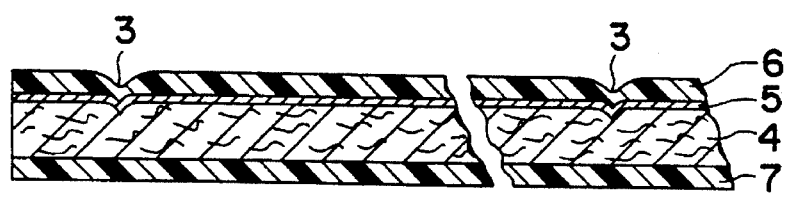
FIG. 4 is an enlarged cross-sectional view of the laminate along the line 4—4 in FIG. 3.

A conventional blank 2 for forming a gable top carton is shown in FIGS. 3 and 4. Blanks are formed from a continuous web of packaging material, and a single blank corresponds to the dimension L in FIG. 3. Crease lines 3 are stamped, or otherwise impressed into the surface that is to become the inside surface of the carton. The laminated blank 2 has a core layer of paper or paperboard 4 and a barrier layer 5, which is typically a layer of aluminum foil. The blank 2 also has an inner product contact layer of low density polyethylene (LDPE) 6 and an outer layer of LDPE 7 (FIG. 4). The crease lines 3 cause indentations in the inner LDPE layer 6 and the barrier layer 5, and in the core layer 4. To form a gable top carton, a single blank having the dimension L is first cut from a continuous web. The blank is then folded transversely and the overlapping side edges 8 (FIG. 3) are heat-sealed to form a tube. The tube is then opened to form a tube of approximately square cross-section. The bottom of the carton is formed by folding and heat-sealing the bottom along the lower strip 9 (FIG. 3). After the carton is filled, the top is folded and sealed along the upper strip 9. The portions 14 (FIG. 3) are heat-sealed at temperatures between 250° F. and 500° F. to bond the inner and outer LDPE layers together.

It has been discovered that a thin coating of $SiO_x$ provides an effective oxygen barrier when coated on a thermoplastic substrate by plasma enhanced chemical vapor deposition (PECVD). The $SiO_x$ coating has a higher ductility than silicon oxide coatings formed by conventional chemical vapor deposition processes. Packaging laminates containing a layer of $SiO_x$ in accordance with this invention can be folded and heat-sealed on conventional packaging machines without causing cracks or holes in the barrier layer.

Figure 1:
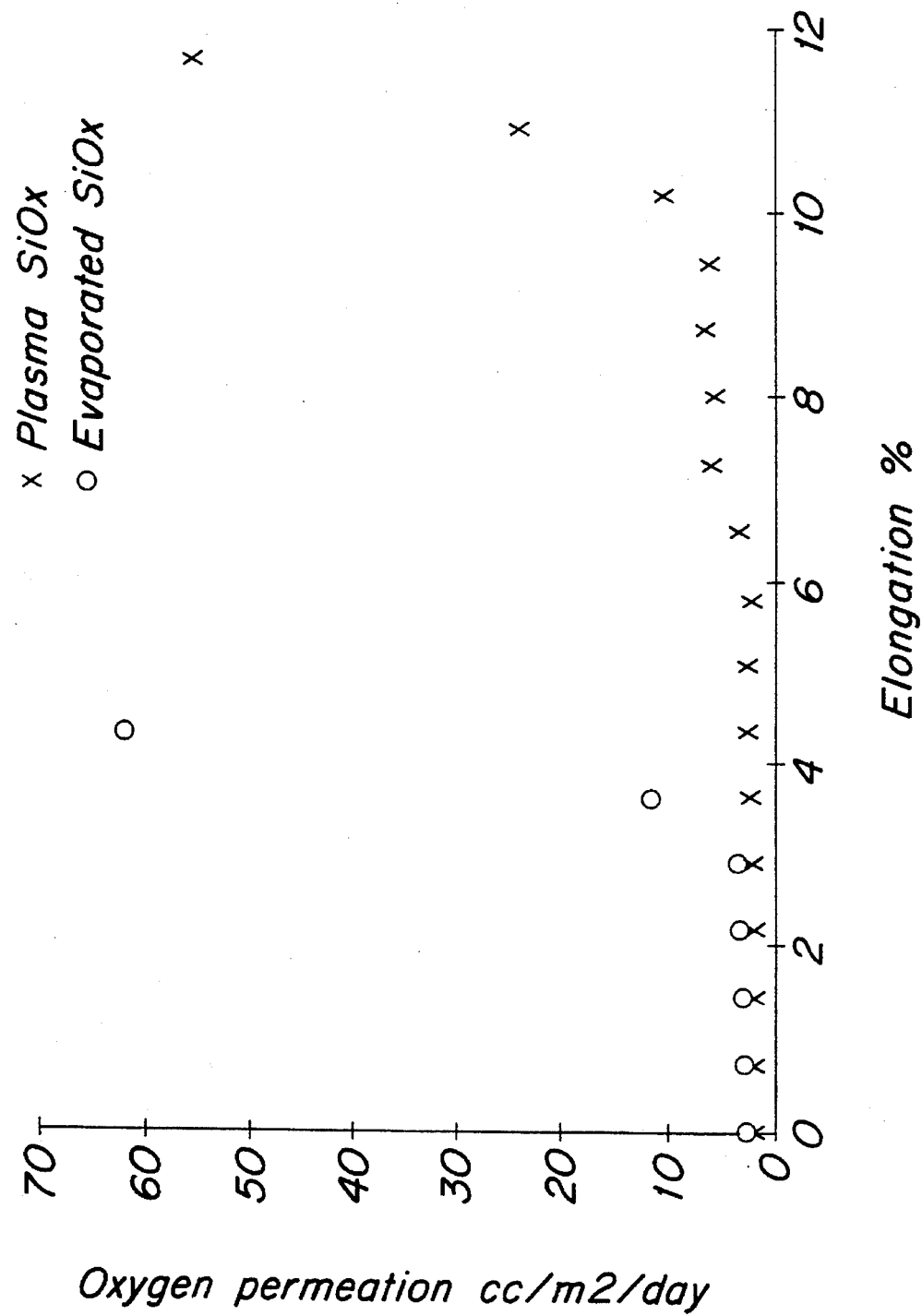
FIG. 1 is a graph showing the relationship of percent elongation to oxygen permeability for a conventional laminate of $SiO_x$ and polyester and for the $SiO_x$ laminate of this invention.

As shown in FIG. 1, a silicon oxide coating applied by PECVD is able to withstand a substantial amount of elongation before cracks in the silicon oxide coating cause leakage. The particular laminate that was tested to provide the data for FIG. 1 is a laminate of silicon oxide deposited by plasma enhanced chemical vapor deposition and had an average thickness of 200 Å. The substrate was a sheet of polyester having a thickness of 12 microns (0.5 mils). As shown in FIG. 1, a coating of substantially the same thickness applied by vapor deposition is able to withstand less elongation without substantially increasing oxygen permeability. It is believed that this is partially explained by the chemical bonding between the coating and the substrate that occurs in plasma enhanced chemical vapor deposition, but does not occur in conventional vapor deposition processes.

It is desirable to produce a thin coating of silicon oxide because this allows the coating process to proceed faster. Also, a thick coating on the substrate tends to cause curling of the laminate which makes later fabrication more difficult.

Figure 2:
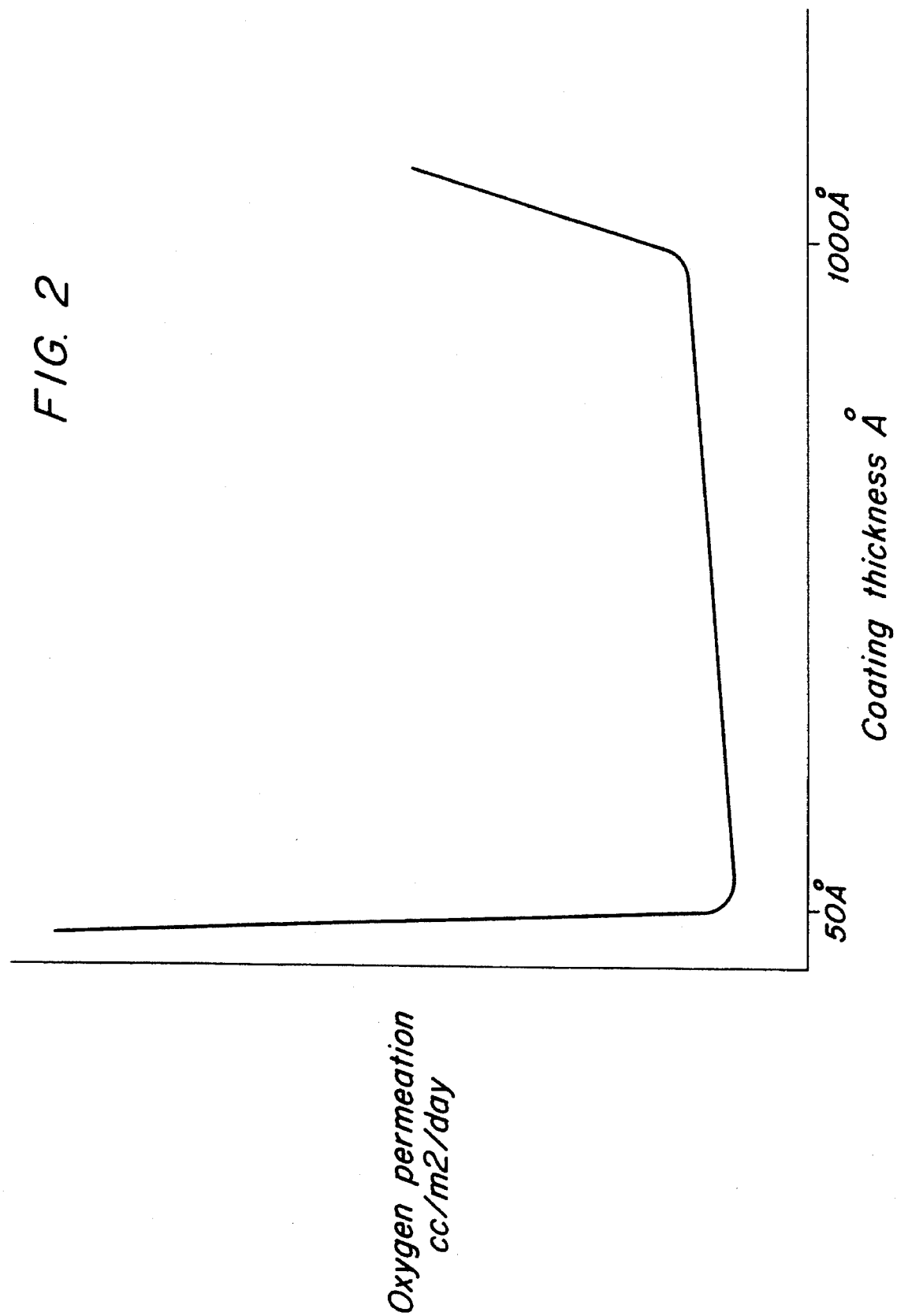
FIG. 2 is a graph showing the relationship of the thickness of the $SiO_x$ barrier layer of this invention to oxygen penetration.

FIG. 2 is a graphical representation of the relationship between oxygen permeability of the laminate to the thickness of the silicon oxide layer. Below about 50 Å, there is insufficient coverage of the silicon oxide to serve as a substantial barrier to the oxygen. Above 1,000 Å, it is believed that the increase in permeability is a result of the formation of internal stresses. Preferably, the $SiO_x$ layer has a thickness of between 50 Å and 500 Å.

In order to utilize the $SiO_x$ barrier layer produced in the plasma enhanced chemical vapor deposition process as a packaging laminate for food products, certain additional layers should be included.

Figure 5:
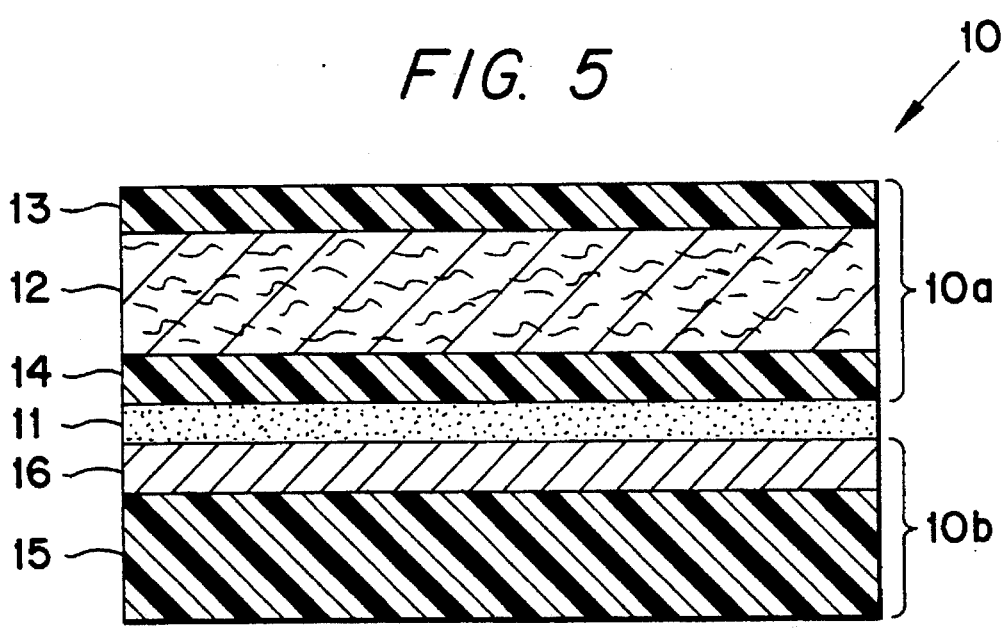
FIG. 5 schematically illustrates a packaging laminate according to a first embodiment of the present invention.

A preferred embodiment of the packaging laminate of this invention is shown in FIG. 5. The laminate 10 comprises two prefabricated laminates 10a and 10b which are permanently bonded to one another by an intermediate layer 11 of an adhesive. The first laminate 10a has a rigid but foldable core layer of paper or paperboard 12 and two outer layers of LDPE 13 and 14, which are heat-sealable.

The second laminate 10b has a substrate or carrier layer 15 on which a thin $SiO_x$ layer 16 has been deposited by PECVD. The layer 16 acts as an oxygen gas and aroma barrier and consists of a silicon oxide of the general formula $SiO_x$, in which x may vary between 1.5 to 2.2. The silicon oxide layer 16 which is deposited on the substrate or carrier layer 15 by PECVD has a thickness of between 50 and 500 Å which imparts to the packaging laminate 10 the desired oxygen gas and barrier properties. The substrate or carrier layer 15 is a flexible thermoplastic material which is heat-sealable at a temperature between 250° F. and 500° F. with the LDPE layer 13, to produce packages for food products. For example, the carrier layer 15 could be formed of LDPE.

The packaging laminate 10 is produced by bonding together the first laminate 10a and the second laminate 10b with an adhesive 11 which is applied between the webs for permanent bonding of the webs for the formation of the finished packaging laminate 10.

Figure 6:
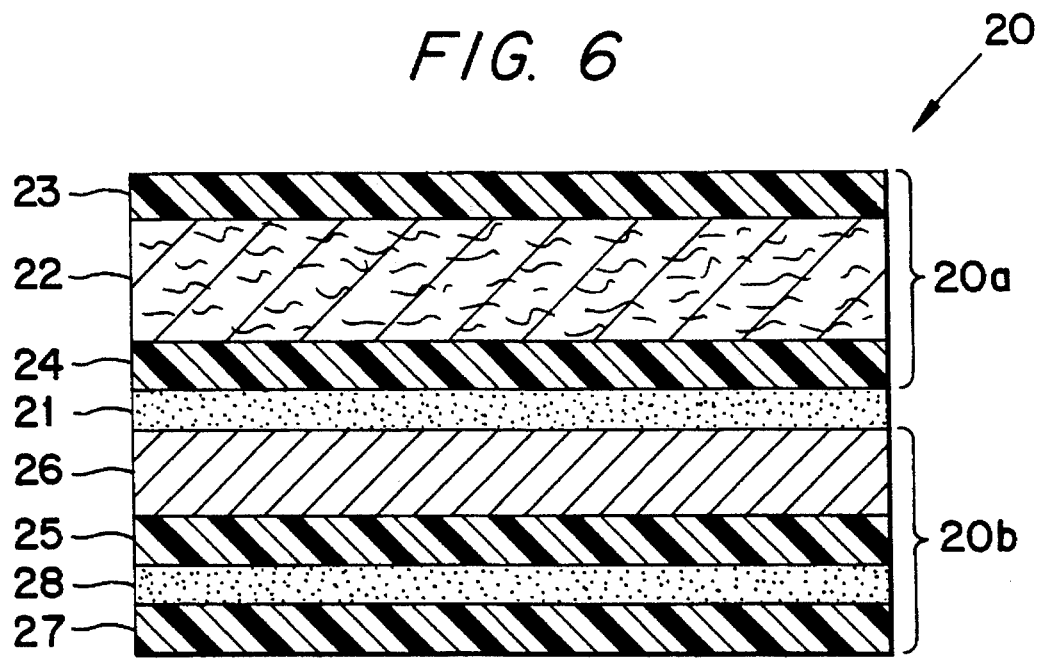
FIG. 6 schematically illustrates a packaging laminate according to a second embodiment of the present invention.

FIG. 6 shows another embodiment of the packaging laminate according to the present invention for producing a package possessing superior oxygen gas and aroma barrier properties by fold formation and sealing. The packaging laminate 20 comprises a first laminate unit 20a and a second laminate unit 20b which are permanently bonded to one another by an intermediate adhesive layer 21. The first laminate unit 20a has a rigid but foldable core layer 22 of paper or paperboard and outer LDPE layers 23 and 24.

The second laminate unit 20b has a substrate or carrier layer 25 of flexible plastic, e.g., polyethylene terephthalate (PET), amorphous polyester, biaxially-oriented polyester or polypropylene which, on its side facing the laminate unit 20a, carries an oxygen gas and aroma barrier layer 26 which consists of a silicon oxide of the general formula $SiO_x$, in which x may vary within 1.5 to 2.2. The other side of the substrate or carrier layer 25 has an outer layer 27 of thermoplastic which is heat-sealable at temperatures between 250° F. and 500° F. with the thermoplastic in the outer thermoplastic layer 23 of the laminate 20a and which is bonded to the substrate or carrier layer 25 with the aid of an intermediate adhesive layer 28.

In the laminate 20 of this embodiment, the layer of silicon oxide acting as the oxygen gas and aroma barrier has been produced by PECVD and has a thickness of 50–500 Å, and preferably between 100 and 200 Å, which is fully sufficient to impart to a packaging container produced from the packaging laminate the desired oxygen gas and aroma barrier properties.

The packaging laminate 20 may be produced by bonding together the prefabricated web of the laminate unit 20a and the prefabricated web of the laminate unit 20b by means of an adhesive layer which is applied between the two webs for the formation of the finished packaging laminate 20. Another method of forming the laminate 20 is by coextrusion of the layers 21 and 24 to layers 25 and 26, and then coextruding layers 28 and 27 against this laminate.

Figure 7:
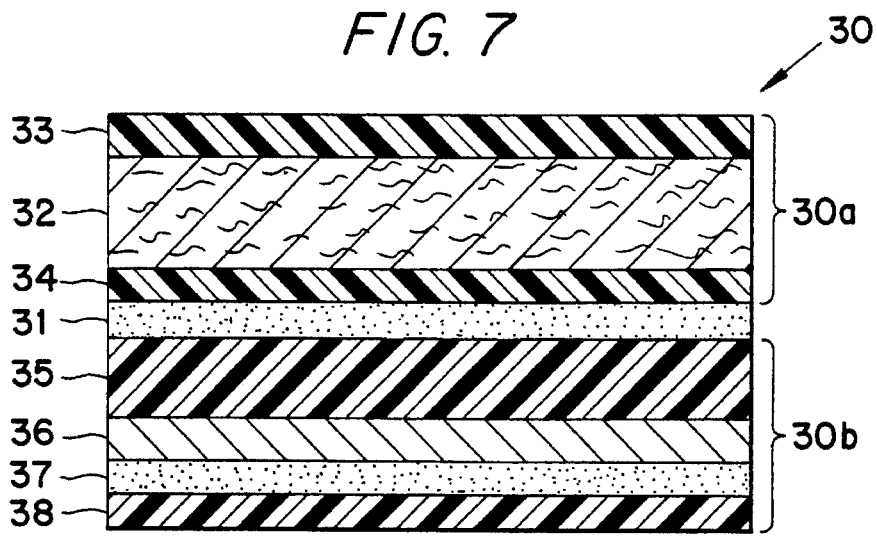
FIG. 7 schematically illustrates a packaging laminate according to a third embodiment of the present invention.

FIG. 7 shows yet a further embodiment of a packaging laminate according to the present invention for producing a package possessing superior oxygen gas and aroma barrier properties by fold formation and sealing. The packaging laminate 30 comprises a first laminate unit 30a and a second laminate unit 30b which are permanently bonded to one another by an intermediate adhesive layer 31. The first laminate unit 30a has a rigid but foldable core layer 32 of paper or paperboard and outer surrounding layers of thermoplastic 33 and 34.

The second laminate unit 30b comprises a substrate or carrier layer 35 of plastic which, on its side facing away from the laminate unit 30a, carries a layer 36 acting as oxygen gas and aroma barrier and consisting of a silicon oxide of the general chemical formula $SiO_x$, in which x may vary within 1.5 to 2.2. The silicon oxide layer 36 is covered by an outer layer of thermoplastic 38 which is heat-sealable with the thermoplastic in the outer thermoplastic layer 33 of the laminate unit 30a and which is bonded to the silicon oxide layer 36 by the intermediary of an intermediate adhesive layer 38. Alternatively, another method of forming the laminate 30 is by coextruding the layers 31 and 34 to layers 35 and 36, and then coextruding layers 37 and 38 against this laminate.

The packaging laminate 30 differs from the packaging laminate 20 in FIG. 6 only in that the second laminate unit 30b is laminated to the first laminate unit 30a with the silicon oxide layer 36 facing away from the first laminate unit 30a. However, as in the packaging laminate 20, the silicon oxide layer 36 is produced by plasma enhanced chemical vapor deposition and has a thickness of between 50 and 500 Å which has proved to be fully sufficient to impart superior oxygen gas and aroma barrier properties to a packaging container produced from the packaging laminate 30.

Figure 8:
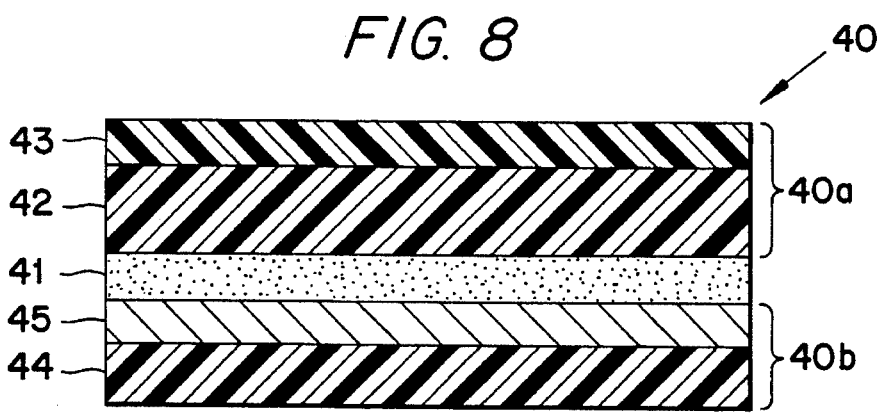
FIG. 8 schematically illustrates a packaging laminate according to a fourth embodiment of the present invention.

FIG. 8 shows still a further embodiment of a packaging laminate according to the present invention for producing a package possessing superior oxygen gas and aroma barrier properties by fold formation and heat-sealing. The packaging laminate 40 comprises a first laminate unit 40a and a second laminate unit 40b which are permanently bonded to one another by an intermediate adhesive layer 41.

The first laminate unit 40a includes a rigid but foldable core layer 42 of a heat-sealable plastic material, e.g., foamed or expanded polyethylene, foamed or expanded polypropylene, foamed or expanded polyester, or mineral-filled polypropylene, and an outer surrounding layer 43 of heat-sealable thermoplastic that is capable of being bonded to the core layer 42 by heat sealing.

The second laminate unit 40b comprises a substrate or carrier layer 44 of a thermoplastic which is heat-sealable to the outer thermoplastic layer 43 or the core layer 42 of the first laminate unit 40a, e.g., polyester or polypropylene, and which, on its side facing the first laminate unit 40a, carries a layer 45 acting as oxygen gas and aroma barrier and consisting of a silicon oxide of the general chemical formula $SiO_x$, in which x may vary within 1.5 to 2.2.

In the laminate 40 of this embodiment, the layer 45 of silicon oxide acting as the oxygen gas and aroma barrier has been produced by plasma enhanced chemical vapor deposition and has a thickness of 50–500 Å which is fully sufficient to impart to a packaging container produced from the packaging laminate 40 superior oxygen gas and aroma barrier properties.

Figure 9:
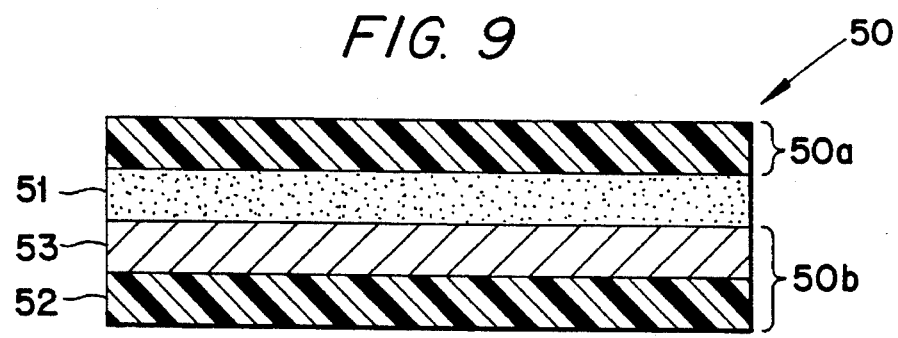
FIG. 9 schematically illustrates a packaging laminate according to a fifth embodiment of the present invention.

FIG. 9 schematically illustrates a packaging laminate 50 according to the present invention for producing a package of the bag type, without a paper or paperboard core layer. The packaging laminate 50, comprises a first prefabricated laminate unit or flexible plastic film 50a and a second prefabricated laminate unit 50b which are permanently bonded to one another by an intermediate adhesive layer 51. The first laminate unit or plastic film 50a consists of a single layer of a flexible heat-sealable thermoplastic, e.g., polyester, polyethylene or polypropylene, that is capable of being heat-sealed at a temperature of 250° F. to 500° F. in a conventional heat-sealing machine. The second laminate unit 50b comprises a substrate or carrier layer 52 which, on its side facing the laminate unit 50a, carries a layer 53 acting as an oxygen gas and aroma barrier layer and consists of a silicon oxide of the general chemical formula $SiO_x$, in which x may vary from 1.5 to 2.2. The substrate or carrier layer 52 consists of a thermoplastic which is flexible and heat-sealable at a temperature between 250° F. and 500° F. to the thermoplastic layer in the first laminate unit 50a. For example, the carrier layer 52 may be formed of polyester, polyethylene or polypropylene. Alternatively, if the package is formed in such a manner that the layer 50a is heat-sealed to itself, it would not be necessary for the layer 52 to be heat-sealable.

In the laminate 50 of this embodiment, the layer 53 acting as oxygen gas and aroma barrier has been produced by plasma enhanced chemical vapor deposition and has a thickness of between 50 and 500 Å which imparts to a bag package produced from the packaging laminate 50 the desired oxygen gas and aroma barrier properties.

The packaging laminate 50 is produced by bonding the thermoplastic layer of the first laminate unit 50a to the second laminate unit 50b by means of an adhesive layer 51 which is applied between the two units. The laminate 50 may be formed into packages as described above, including forming crease lines in the inner layer 50a and partially into the barrier layer 53. These crease lines facilitate folding of the laminate along predetermined lines. Since all of the layers of the laminate 50 are flexible, this laminate can be used to produce a flexible wall package. The laminate 50 is substantially transparent, since each of the layers are transparent.

Figure 10:
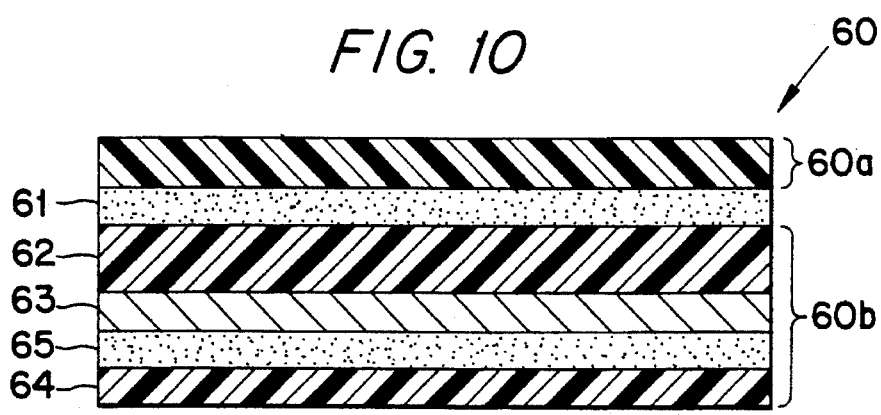
FIG. 10 schematically illustrates a packaging laminate according to a sixth embodiment of the present invention.

FIG. 10 schematically illustrates a packaging laminate according to the present invention for producing a sealing strip for use in a packaging container. The packaging laminate 60 comprises a first laminate unit 60a and a second laminate unit 60b which have been permanently bonded to one another by an intermediate adhesive layer 61.

The first laminate unit 60a is formed of polyethylene. The second laminate unit 60b comprises a substrate or carrier layer 62 of plastic, e.g., polyester, biaxially-oriented polyester or polypropylene which, on its side facing away from the first laminate unit 60a, carries a barrier layer 63 acting as oxygen gas and aroma barrier and consisting of a silicon oxide of the general chemical formula $SiO_x$, in which x may vary within 1.5 to 2.2. The silicon oxide layer 63 is covered by an outer layer of thermoplastic 64, e.g., polyethylene, which is bonded to the silicon oxide layer 63 by an intermediate adhesive layer 65.

The layer of silicon oxide 63 has been produced by PECVD and has a thickness of between 50 and 500 Å which imparts to the packaging laminate 60 the desired oxygen gas and aroma barrier properties. The packaging laminate 60 is produced by bonding together the thermoplastic layer of the first unit 60a with the second laminate unit 60b by means of an adhesive layer 51 which is applied between the units.

Figure 11:
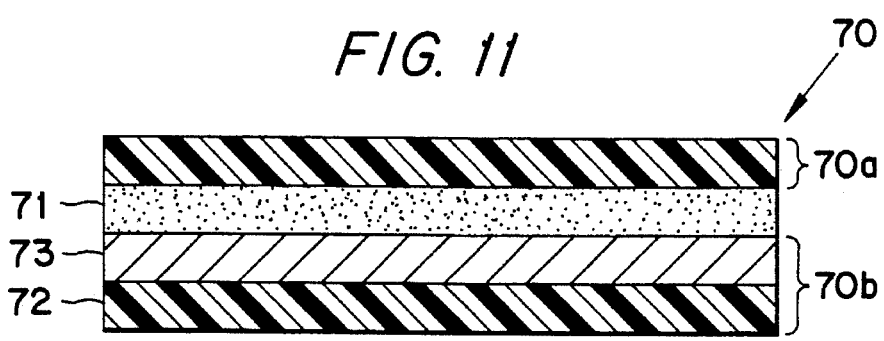
FIG. 11 schematically illustrates a packaging laminate according to a seventh embodiment of the present invention.

FIG. 11 shows a packaging laminate according to the present invention for producing a package laminate that possesses superior oxygen gas and aroma barrier properties. The packaging laminate 70 comprises a first laminate unit or plastic film 70a and a second laminate unit 70b which have been permanently bonded to one another by an intermediate adhesive layer 71. The first laminate unit 70a comprises a flexible or foldable thermoplastic material, foamed or expanded polypropylene, foamed or expanded polyester or mineral-filled polypropylene.

The second laminate unit 70b comprises a substrate or carrier layer 72 of thermoplastic which is heat-sealable with the thermoplastic in the first laminate unit 70a. The side of the second unit 70b that faces the first laminate unit 70a carries a layer 73 acting as an oxygen gas and aroma barrier and consisting of silicon oxide of the general chemical formula $SiO_x$, in which x may vary within 1.5 to 2.2. Alternatively, if the package is formed in such a manner that the layer 70a is heatsealed to itself, it would not be necessary for the layer 72 to be heat-sealable.

The silicon oxide layer 73 is produced by plasma enhanced chemical vapor deposition and has a thickness of between 50 and 500 Å which imparts to the packaging laminate 70 the desired oxygen gas and aroma barrier properties.

The packaging laminate 70 may be produced by bonding together the first laminate unit 70a and the second laminate unit 70b by means of an intermediate adhesive layer 71 which is applied between the units.

Thus, according to the present invention, there will be realized a packaging laminate of the type described by way of introduction possessing excellent oxygen gas and aroma barrier properties without attendant problems and drawbacks of the type inherent in the prior art technology, pursuant to, for example, European Patent Application published under number 0 378 990. In particular, there will be realized a packaging laminate including a silicon oxide layer produced by chemical plasma deposition and, even at such slight thicknesses as 50–500 Å, making possible the production, by fold formation, of a packaging container possessing superior oxygen gas and aroma barrier properties.

Figure 12:
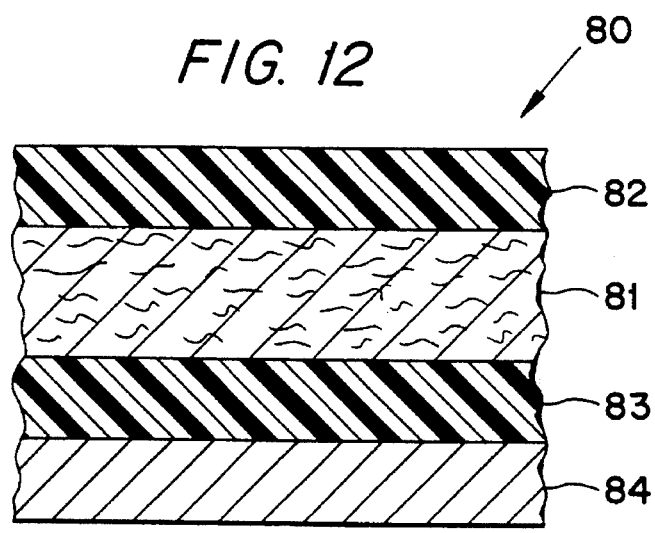
FIG. 12 schematically illustrates a packaging laminate according to an eighth embodiment.

FIG. 12 shows an embodiment in which the $SiO_x$ layer is in direct contact with the product in the interior of the package. In this embodiment, the packaging laminate 80 includes a base layer 81, which may be any suitable material that is flexible, such as paper, foam core, PET, polyamide, polyethylene, or polypropylene. The exterior side of the base layer 81 is coated with an LDPE layer 82. On the interior side of the base layer, a layer of LDPE 83 has a thin coating 84 of $SiO_x$, as described above with respect to the layers 15 and 16 of FIG. 5. The LDPE layer 83 may be bonded to the base layer by a suitable adhesive.

Since the $SiO_x$ coating or layer 84 is exposed on the interior side of the laminate, when the laminate is folded and heat-sealed to form a container, the $SiO_x$ layer 84 will be in direct contact with the contents of the container. When the laminate is used for food product containers, the $SiO_x$ layer 84 is an acceptable material for this purpose, since it would have no deleterious effect on the food contents. Due to the thinness of the $SiO_x$ layer 84, a strong heat seal bond can be formed between the exterior layer 82 and the interior layer 83 when the laminate is folded and formed in conventional packaging machines at a heat sealing temperature of between 250° F. and 500° F. Another way to form a bond using the packaging laminate 80 is to employ ultrasonic heating which causes softening of the LDPE layer 83 without requiring the transmission of heat through the $SiO_x$ layer 84. Alternatively, if the package is formed in such a manner that the layer 84 is heat-sealed to itself, it would not be necessary for the layer 82 to be heat-sealable.

As an example of a preferred packaging laminate in accordance with the embodiment of FIG. 12, the exterior LDPE layer should have a thickness of about 15 microns and the interior LDPE layer should have a thickness of about 15 microns. The base layer 81, if present, should have a thickness of between 15 microns and 200 microns. The $SiO_x$ layer 84 should have a thickness of between 50 and 500 Å. A laminate having layers of these thicknesses will have good barrier properties and will be capable of being formed into packages by heat-sealing without causing holes or tears that might cause the packages to leak.

While the present invention has been described above with reference to specific laminate structures, it is, naturally, not restricted exclusively to such structures. Without departing from the spirit and scope of the inventive concept as defined in the appended Claims, it is possible, and obvious to a person skilled in the art, to select other materials in respect of both the substrate or the carrier layer and the core layer than those specifically disclosed herein. For example, it is possible, within the purview of the inventive concept as herein disclosed, to employ as material for the substrate or carrier layer a layer of greaseproof paper, where desired.

The laminate of this invention has a gas barrier layer that is effective in thicknesses as low as 50 Å, and in a preferred thickness of 200 Å. The advantage of thin coatings resides principally in the superior mechanical properties which are related to their lower internal stresses. This means that such thin coatings have better resistance to cracking which is particularly important in the case of the containers formed by creasing and folding as described in this application. The corners and folded edges of such containers are particularly sensitive areas and the use of materials with thicker coatings will result in cracks in these parts of the package and consequent loss of barrier properties. In contrast, the thin coatings as disclosed in this application are sufficiently flexible and extensible to make possible a conversion of the material to packing containers without any danger of cracking or breaking even in the most exposed areas. The lower internal stresses of the thin coatings are also reflected in the property that these materials do not curl. Thick coatings on plastic films curl which can cause problems during subsequent processing to produce laminates.

It should finally be observed that a packaging laminate according to the present invention, in addition to superior oxygen gas and aroma barrier properties, also possesses the advantage that it is of the non-scalping type, and as a result the silicon oxide layer of the packaging laminate can be employed in direct contact with package contents which are particularly storage-sensitive, such as fruit juice, without "scalping" or impoverishing the contents of its aromatic flavorings, essential oils, which occur in generous quantities in this type of contents.

While this invention has been illustrated and described in accordance with several preferred embodiments, it should be recognized that variations and changes may be made without departing from the invention as set forth in the claims.

What is claimed is:

1. A packaging container comprising:
 a flexible laminate shaped to form a container, said laminate having a first layer of $SiO_x$ in which x is within the range of between about 1.5 and about 2.2, said first layer having a thickness between about 50 and about 500 angstroms and being formed by plasma-enhanced chemical vapor deposition, and a second layer of a flexible thermoplastic material to which the first layer is bonded, said laminate having seam bonding adjacent portions of said second layer to form a sealed container.

2. The packaging container according to claim 1 wherein said laminate has crease lines for folding the laminate to form a sealed enclosure.

3. The packaging container according to claim 1 wherein said first layer is formed from a mixture of a vaporized organic silicon compound and oxygen in a vacuum.

4. The packaging container according to claim 3 wherein said organic silicon compound is hexamethyl disiloxane.

5. The packaging container according to claim 1 wherein said second layer is formed of polyethylene.

6. The packaging container according to claim 1 wherein said seams are bonded by a heat seal.

7. The packaging container according to claim 1 wherein said first layer is exposed on the interior of said packaging container.

8. The packaging container according to claim 1 wherein said laminate includes a third layer of a thermoplastic material, said first layer being between said second and third layers.

9. The packaging container according to claim 1, wherein said laminate has $O_2$ permeability of $\leq 10$ cc/m$^2$/day at an elongation of up to about 10%.

10. The packaging container according to claim 1, wherein said laminate has $O_2$ permeability of about $\leq 4$ cc/m$^2$/day at an elongation of up to about 7%.

11. The packaging container according to claim 1, wherein the flexible laminate further comprises a third layer of paper or paperboard.

12. A preformed package blank comprising: a flexible laminate having a first layer of $SiO_x$ formed by plasma-enhanced vapor deposition, in which x is within the range of between 1.5 and 2.2, and a second layer of a flexible thermoplastic material to which the first layer is bonded, said laminate having crease lines to facilitate folding of the laminate, said first layer being deformed by said crease lines, and means for sealing said laminate when folded to form a sealed container for perishable food products.

13. A preformed package blank according to claim 12 wherein said means for sealing includes a thermoplastic heat seal.

14. A preformed package blank according to claim 12 wherein said first layer is on the side of the blank that forms the interior surface of the package when formed.

15. A preformed package blank according to claim 12 wherein the laminate includes a third layer of a thermoplastic material, said first layer being between said second and third layers.

16. A packaging laminate for making containers having good gas and aroma barrier properties, comprising:
 a base layer of paper, paperboard, or thermoplastic; and
 a barrier layer having a thickness of between about 50 and about 500 angstroms, said barrier layer being applied on the base layer by plasma enhanced chemical vapor deposition, and the barrier layer consists essentially of a silicon compound of formula $SiO_x$ in which x is within the range of about 1.5 to 2.2

17. The packaging laminate according to claim 16, wherein the barrier layer of silicon compound has a thickness of about 50–200 angstroms.

18. The packaging laminate according to claim 16 wherein the base layer is polyethylene.

19. The packaging laminate according to claim 16 wherein the base layer is polyester.

20. The packaging laminate according to claim 16 including a third layer, the base layer being between the barrier layer and the third layer.

21. The packaging laminate according to claim 20 wherein the base layer is thermoplastic and the third layer is paper.

22. A packaging laminate for making containers having good gas and aroma barrier properties, comprising a plurality of layers, one of said layers being a barrier layer having a thickness between about 50 and about 500 angstroms, another of said layers being a base layer, said barrier layer being applied on the base layer by plasma-enhanced chemical vapor deposition and consisting essentially of a silicon compound of formula $SiO_x$ in which x is within the range of about 1.5 to 2.2, at least one of the layers being on the outside of the laminate and being heat sealable at a temperature between about 250° F. and 500° F., said base layer being a polyester.

23. The packaging laminate according to claim 22 wherein the barrier layer is one of the outside layers.

24. The package laminate according to claim 22 wherein the barrier layer is an interior layer.

25. The packaging laminate according to claim 22 wherein at least two of the layers are bonded together by being coextruded.

26. The packaging laminate according to claim 22 wherein at least two of the layers are bonded together by an adhesive layer.

27. The packaging laminate according to claim 22 wherein one of the layers is paper.

28. The packaging laminate according to claim 22, wherein said laminate has $O_2$ permeability of about $\leq 10$ cc/m$^2$/day at an elongation of up to about 10%.

29. The packaging laminate according to claim 22, wherein said laminate has $O_2$ permeability of about $\leq 4$ cc/m$^2$/day at an elongation of up to about 7%.

* * * * *